United States Patent [19]

Duboudin et al.

[11] Patent Number: 5,064,915
[45] Date of Patent: Nov. 12, 1991

[54] PRODUCTION OF INFUSIBLE POLYCARBOSILANES CONVERTIBLE INTO SILICON CARBIDE CERAMICS

[75] Inventors: Francoise Duboudin, Pessac; Odile Babot, Villenave D'Ornon; Jean-Paul Pillot, Cestas; Jacques Dunogues, Talence; Eric Bouillon, Cany Barville; Rene Pailler, Cestas, all of France

[73] Assignee: Rhone-Poulenc Chimie, Courbevoie, France

[21] Appl. No.: 441,693

[22] Filed: Nov. 27, 1989

[30] Foreign Application Priority Data

Nov. 25, 1988 [FR] France ............................ 88/15394

[51] Int. Cl.$^5$ .......................................... C08F 283/00
[52] U.S. Cl. .................................... 525/474; 528/31; 528/33; 528/35
[58] Field of Search .................... 525/474; 528/33, 35, 528/31

[56] References Cited

U.S. PATENT DOCUMENTS 3,853,567  12/1974  Verbeek ................... 106/44
4,719,273  1/1988  Seyferth et al. ............ 528/31

FOREIGN PATENT DOCUMENTS 0167230  1/1986  European Pat. Off. .
0298630  1/1989  European Pat. Off. .

Primary Examiner—Melvin I. Marquis
Attorney, Agent, or Firm—Burns, Doane, Swecker & Mathis

[57] ABSTRACT

Infusible and insoluble polycarbosilanes, readily pyrolyzed into silicon carbide ceramic materials, e.g., SiC fibers, are produced by hardening a fusible polycarbosilane containing at least two ≡SiH groups per molecule via intimately contacting such fusible polycarbosilane with an effective hardening amount of the vapors of sulfur.

14 Claims, No Drawings

PRODUCTION OF INFUSIBLE POLYCARBOSILANES CONVERTIBLE INTO SILICON CARBIDE CERAMICS

BACKGROUND OF THE INVENTION

Field of the Invention

The present invention relates to the production of infusible polycarbosilanes and to the conversion of such infusible polycarbosilanes into ceramic articles based on silicon carbide, notably silicon carbide fibers.

Description of the Prior Art

The production of ceramic articles by thermal degradation of organosilicon polymers in a controlled atmosphere is known to this art; numerous literature articles and patents exist on the subject.

One advantage of this "polymer" technique resides, in particular, in the possibilities for shaping this type of product, notably into ceramic silicon carbide fibers, after pyrolysis thereof.

According to the conventional technique, the polymer precursors of polycarbosilane type (possibly after the melting thereof, if originally they are in the solid state) are extruded in the form of continuous fibers (or filaments), which subsequently are treated, in particular to improve their high temperature and/or mechanical strength, and then pyrolyzed in a suitable atmosphere to produce the desired silicon carbide ceramic fiber.

The pretreatment of the fibers prior to pyrolysis, typically designated a hardening, infusibility or cross-linking treatment, is an essential stage in any process for the preparation of ceramic fibers.

At the present time, the hardening of polycarbosilane fibers entails either physical techniques (electronic, UV-irradiation, etc.) or chemical techniques.

The aforementioned physical techniques have the major disadvantage of being awkward and expensive. Therefore, the only economical technique utilized on an industrial scale is chemical hardening by means of an oxygen treatment.

Nonetheless, the introduction of oxygen into silicon carbide fibers presents the drawback of greatly reducing their mechanical strength at application temperatures in excess of 1,000° C.

SUMMARY OF THE INVENTION

Accordingly, a major object of the present invention is the provision of a simple, effective, economical and easily carried out technique for the production of infusible polycarbosilanes having improved mechanical and thermal properties in a very wide variety of forms (filaments, fibers, molded articles, coatings, films, and the like), which technique conspicuously avoids those disadvantages and drawbacks to date characterizing the state of this art.

Another object of this invention is the provision of an improved process for the production of ceramic articles based on silicon carbide, particularly ceramic silicon carbide fibers having good mechanical strengths.

Briefly, the present invention features a process for the production of infusible polycarbosilanes, comprising hardening a fusible polycarbonsilane containing at least two $\equiv$SiH groups per molecule by intimately contacting same with an effective hardening amount of the vapors of sulfur.

This invention also features the production of silicon carbide ceramic materials, e.g., SiC fibers, by pyrolyzing, preferably under an inert atmosphere or in a vacuum, the infusible polycarbosilanes thus prepared.

DETAILED DESCRIPTION OF THE PREFERRED EMBODIMENTS OF THE INVENTION

More particularly according to the present invention, the polycarbosilane starting materials are polymers well known to this art; these polymers may be prepared from a very wide variety of beginning intermediates utilizing a wide variety of different techniques.

It will of course be appreciated that polycarbosilanes are organosilicon compounds having carbon atoms and silicon atoms as the principal components of their molecular skeletons and which may have structures of the linear, cyclic or mixed type, i.e., structures in which linear carbosilane recurring units and cyclic carbosilane recurring units are bonded chemically.

According to the present invention, such polycarbosilanes must contain at least two and preferably at least three $\equiv$SiH groups per molecule.

The synthesis of such polycarbosilanes may be carried out by the techniques described, in particular, in FR 2,308,590, FR 2,308,650, FR 2,327,836, FR 2,345,477, FR 2,487,364 and EP 51,855, all of which are hereby expressly incorporated by reference.

Prior to the hardening treatment according to the invention (more fully described below), the polycarbosilanes are formed by any one of a number of shaping operations to impart various configurations thereto, such as filaments, fibers, molded articles, support coatings and the like. The treatment according to the invention is thus advantageously used for the hardening of polycarbosilane fibers which, after treatment, are then pyrolyzed to produce ceramic fibers based on silicon carbide.

According to the invention and after optional forming, the polycarbosilanes described above are then treated with sulfur vapors.

The sulfur vapors may be used in the pure state, or they may be diluted in an inert gas, such as argon (or any other rare gas) or nitrogen, for example.

The polycarbosilanes and the vapors may be intimately contacted with each other in a static or a dynamic state, i.e., in a flowstream of vapors.

The vapors may be generated by any known means, in particular by the vaporization of sulfur, or by the decomposition of any compound capable of generating sulfur under the practical conditions of the treatment according to the invention.

The temperature at which the treatment is carried out may vary widely and depends on the nature of the polycarbosilane to be hardened.

In practice, this temperature generally ranges from 150° C. to the softening temperature of the polymer; it is even possible to conduct the operation at temperatures higher than the softening point in light of the quasi-instantaneous nature of the polycarbosilane hardening treatment in the presence of sulfur vapors. Nevertheless, and preferably, the temperature of the treatment advantageously ranges from 200° C. to a temperature slightly less than that corresponding to the softening point of the polycarbosilane to be hardened.

The duration of the treatment according to the invention is not critical and may vary from a few seconds to several days and preferably from a few minutes to several hours.

In general, this duration depends on the temperature of the treatment; the higher the temperature, the shorter the duration may be.

Upon completion of the treatment according to the invention, a polycarbosilane that is perfectly infusible and insoluble in most organic solvents, in particular in hexane, is obtained.

Depending on the amount of the sulfur used, the duration and the temperature of the treatment, together with the nature of the initial polycarbosilane, the treated product may contain quantities of sulfur generally ranging from 3% to 30% by weight relative to the total weight of the product, and preferably ranging from 10% to 20% by weight.

Without wishing to be bound to any particular theory, the gradual disappearance of the ≡SiH bands observable by infra-red analysis of the polymer over the course of the treatment would appear to indicate that the hardening according to the invention may take place by the creation of bonds of the ≡Si—S—Si≡ type within said polymer.

The sulfur incorporated in this manner may be gradually eliminated during a subsequent heat treatment (pyrolysis) carried out to convert the hardened polycarbosilane into a silicon carbide ceramic, as more fully described below.

In conventional and known manner, the pyrolysis is typically carried out in a vacuum or in an atmosphere inert with respect to silicon carbide, at a temperature ranging from approximately 800° to 1,500° C., until the infusible polycarbosilane is completely converted into a ceramic based on silicon carbide.

As indicated above, the process according to the invention may be integrated particularly well into general conventional processes for the production of ceramic fibers based on silicon carbide, from precursors of the polycarbosilane type.

In order to further illustrate the present invention and the advantages thereof, the following specific examples are given, it being understood that same are intended only as illustrative and in nowise limitative.

In said examples to follow, the production of ceramic fibers based on silicon carbide was featured.

EXAMPLES

Preparation of polycarbosilane fibers

The polycarbosilane used was synthesized by heating a polydimethylsilane at 470° C. in an autoclave, according to the technique described by S. Yajima et al, *J. Mater. Sci.*, (13), 2569 (1978) and FR 2,308,650.

The selective elimination of high molecular weight polymers contained in the polycarbosilane specimens prepared in this manner (optional, but preferred stage in the extrusion of the fibers) may be carried out, in particular, by the selective dissolution of the polymers of moderate molecular weights in ethyl acetate (at a temperature of from 30° to 50° C.), then recovering the polycarbosilane, fraction thus dissolved. See copending application Ser. No. 441,691, filed concurrently herewith.

Commercial polycarbosilanes, such as those marketed by Nippon Carbon Co., are also suitable starting materials.

The polycarbosilanes obtained in this manner were then extruded and drawn in the form of fibers having an average diameter of 15 $\mu$m.

EXAMPLE 1

The apparatus was a reactor (of Pyrex, for example), equipped with an inert gas (for example argon) inlet and an outlet provided with a condenser.

Into this reactor were placed 6.4 g fibers prepared as above, and 4.2 g solid sulfur.

The reactor was then heated by means of a salt bath at 350° C. for 3 hours, 45 minutes.

The fibers obtained upon completion of the treatment were yellow in color, infusible and insoluble, in particular by hexane.

The fibers then contained 15% to 20% of sulfur. Infrared analysis indicated the complete disappearance of the $\sqrt{}$(Si—H) band that was observed in the initial polycarbosilane.

Following pyrolysis in purified argon at 1,200° C. (rate of temperature increase: 5° C./min, maintenance for 1 hour at this temperature), the sulfur content was 5%.

After pyrolysis at 1,400° C. and maintenance for one hour at this temperature, the sulfur content was only 0.7% further continuation of pyrolysis completely eliminates the sulfur values. A ceramic fiber based on silicon carbide was then produced.

EXAMPLE 2

The apparatus for hardening by sulfur in this example was a tubular enclosure heated by a resistance furnace, into which a slight current of purified argon was introduced (or purified nitrogen). A boat containing solid sulfur was positioned in an upstream end of the enclosure where the temperature was in excess of 140° C., and released sulfur in the form of a vapor thereof. The released sulfur was transported by the carrier gas into contact with the polycarbosilane fibers, which had been placed in a second boat positioned in a downstream end of the enclosure, where the prevailing temperature was $\Theta_1$.

The rate of the increase in temperature to $\Theta_1$ was controlled as follows:

(i) ambient→ 140° C.: 60° C./hour;
(ii) 140° C.→ $\Theta_1$: 5° C./hour.

Table I summarizes the different hardening experiments (Experiments A1 to A5) for each different $\Theta_1$.

TABLE

| Experiment | Hardening temperature ($\Theta_1$) | Maintenance time (at $\Theta_1$) | Weight % of S on treated fibers | Appearance | Remarks |
|---|---|---|---|---|---|
| A1 (Comparative) | — | — | 0 | white | without treatment F |
| A2 | 180° C. | 4 h | 3.5 | straw yellow ↓ | I/F |
| A3 | 200° C. | 4 h | 4.5 | | I |

TABLE-continued

| Experiment | Hardening temperature ($\Theta_1$) | Maintenance time (at $\Theta_1$) | Weight % of S on treated fibers | Appearance | Remarks |
| --- | --- | --- | --- | --- | --- |
| A4 | 220° C. | 4 h | 6 | | I |
| A5 | 240° C. | 4 h | 7 | light brown | I |

Note:
F indicates fusible
I indicates infusible

The fibers obtained after treatment according to Experiment A4 were then pyrolyzed in a sealed silica ampoule under a vacuum at a temperature up to 850° C. and then in an oven, whether or not at a higher temperature, under a purified argon atmosphere.

Table II summarizes the pyrolysis experiments (Experiments B1 and B2) and evidences the elimination of sulfur during the high temperature treatment. The fibers obtained were ceramic fibers based on silicon carbide.

TABLE II

| Experiment | Pyrolysis temperature | Weight percentage of sulfur in the pyrolyzed fiber | Appearance |
| --- | --- | --- | --- |
| B1 | 850° C. | 9 | dark brown |
| B2 | 1,400° C. | 0 | black |

Note:
The weight percentage of sulfur appeared to be higher in Experiment B1 than in the initial product (Experiment A4); this is explained by the fact that during the pyrolysis other elements may be eliminated more rapidly than sulfur.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of an infusible polycarbosilane, comprising hardening a fusible polycarbosilane containing at least two $\equiv$SiH groups per molecule by intimately contacting same with an effective hardening amount of the vapors of sulfur.

2. The process as defined by claim 1, said fusible polycarbosilane containing at least three $\equiv$SiH groups per molecule.

3. The process as defined by claim 1, carried out at a temperature ranging from 150° C. to the softening point of said fusible polycarbosilane.

4. The process as defined by claim 3, carried out at a temperature ranging from 200° C. to slightly less than the softening point of said fusible polycarbosilane.

5. The process as defined by claim 1, said vapors of sulfur being diluted in an inert gas.

6. The process as defined by claim 5, said inert gas comprising argon or nitrogen.

7. The process as defined by claim 1, carried out statically.

8. The process as defined by claim 1, carried out dynamically

9. The process as defined by claim 1, said fusible polycarbosilane comprising a shaped article thereof.

10. The process as defined by claim 9, said shaped article comprising a fiber or filament.

11. The infusible polycarbosilane product of the process as defined by claim 1.

12. An infusible polycarbosilane, characteristically insoluble in organic solvents, said infusible polycarbosilane comprising from 3% to 30% by weight of sulfur.

13. The infusible polycarbosilane as defined by claim 12, comprising from 10% to 20% by weight of sulfur.

14. The infusible polycarbosilane as defined by claim 12, essentially devoid of $\equiv$SiH groups.

* * * * *